US006587808B1

United States Patent

Auer et al.

(10) Patent No.: US 6,587,808 B1

(45) Date of Patent: Jul. 1, 2003

(54) METHOD AND DEVICE FOR CONTROLLING THE TRAVEL SPEED OF A UNIT IN A MACHINE FOR PROCESSING PRINTING MATERIALS

(75) Inventors: Klaus Auer, Hockenheim (DE); Rolf Spilger, Viernheim (DE); Christian Thomas, Walldorf (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 76 days.

(21) Appl. No.: 09/678,955

(22) Filed: Oct. 4, 2000

(30) Foreign Application Priority Data

Oct. 4, 1999 (DE) .......................................... 199 47 628

(51) Int. Cl.[7] .................................................. G01P 3/50

(52) U.S. Cl. ........................................................ 702/145

(58) Field of Search ................................ 702/145, 137; 101/143, 218, 220, 232; 400/279; 271/245; 493/10, 411; 226/414, 8

(56) References Cited

U.S. PATENT DOCUMENTS 4,723,488 A * 2/1988 Inouye et al. ............... 101/143
5,447,566 A * 9/1995 Loiacono .................... 101/220

FOREIGN PATENT DOCUMENTS

| | | | |
|---|---|---|---|
| DE | 32 21 190 A1 | | 12/1983 |
| DE | 94 17 591 U1 | | 2/1995 |
| DE | 196 13 288 C2 | | 10/1997 |
| EP | 0 799 783 B1 | | 10/1997 |
| JP | 402210528 A | * | 2/1989 |

* cited by examiner

*Primary Examiner*—Bryan Bui
*Assistant Examiner*—Tung Lau
(74) *Attorney, Agent, or Firm*—Laurence A. Greenberg; Werner H. Stemer; Ralph E. Locher

(57) ABSTRACT

A method of controlling the travel speed of a unit in a machine for processing printing materials, including monitoring the travel speed by a first measuring device, includes additionally monitoring the travel speed by a second measuring device belonging to the machine; a control device for performing the method; and a machine for processing printing materials having the control device.

14 Claims, 2 Drawing Sheets

METHOD AND DEVICE FOR CONTROLLING THE TRAVEL SPEED OF A UNIT IN A MACHINE FOR PROCESSING PRINTING MATERIALS

BACKGROUND OF THE INVENTION

Field of the Invention

The invention relates to a method of controlling the travel speed of a unit in a machine for processing printing materials, which includes monitoring the travel speed by a first measuring device.

The published European Patent Document EP 0 799 783 A2 describes a control for a sheet-pile lifting drive, which includes a monitoring device for receiving a signal from an evaluation unit via a line precisely at an instant of time when the travelling speed of a pile-carrying plate exceeds a maximum value defined as a function of position. In this case, a drive motor is stopped by the monitoring device. A drawback of the aforedescribed control is that if the monitoring device fails, consequential damage can occur.

The invention further relates to a device for controlling the travel speed of a unit in a machine for processing printing materials, having a motor for driving the unit, which is activatable as a function of instantaneous travel positions of the unit, and having a rotary encoder for registering the instantaneous travel positions.

A device of this general type is; for example, the control described in the aforementioned published European patent document, which has a rotary encoder constructed as an absolute rotary encoder. A drive motor driving the pile-carrying plate is connected to the rotary encoder via a reduction transmission or gearbox so that the entire travel path of the pile-carrying plate does not quite produce one revolution of a rotor of the rotary encoder.

SUMMARY OF THE INVENTION

It is accordingly an object of the invention to provide a method and a device for controlling the travel speed of a unit in a machine for processing printing materials wherein the machine has a high operational reliability.

With the foregoing and other objects in view, there is provided, in accordance with one aspect of the invention, a method of controlling the travel speed of a unit in a machine for processing printing materials, including monitoring the travel speed by a first measuring device, which comprises additionally monitoring the travel speed by a second measuring device belonging to the machine.

In accordance with another mode, the method of the invention includes, during fault-free operation of the machine, simultaneously monitoring the travel speed of the unit by the first measuring device and by the second measuring device, which acts independently of the first measuring device.

In accordance with a further mode, the method of the invention includes detecting by the second measuring device an excessive speed of travel of the unit, resulting from a failure of the first measuring device, and, by the second measuring device, switching over a motor, which drives the unit, to a reduced rotational speed or to stop it.

In accordance with an added mode, the method of the invention includes monitoring the travel speed by the first measuring device over the entire travel distance of the unit, which lies between two opposite end positions, and monitoring the travel speed by the second measuring device only in a critical section of the travel distance.

In accordance with an additional mode, the method of the invention includes having the unit move through the critical travel section shortly before moving a gear wheel fixed to the unit into engagement with a further gear wheel.

In accordance with a second aspect of the invention, there is provided a device for controlling the travel speed of a unit in a machine for processing printing materials, having a motor for driving the unit, the motor being activatable as a function of instantaneous travel positions of the unit, comprising a rotary encoder for registering the instantaneous travel positions, the rotary encoder being constructed as a relative rotary encoder.

In accordance with another feature of the invention, the rotary encoder has a sensor assigned thereto for detecting an end position of the unit, the end position serving as a reference value for automatically calculating the instantaneous travel positions.

In accordance with a further feature of the invention, the rotary encoder has a rotor to which the unit has a drive connection via a gear transmission so that, as the unit moves from one end position to an opposite end position of the unit, the rotor executes a plurality of complete revolutions.

In accordance with an added feature of the invention, the rotary encoder has a control link with a computer for adding up the revolutions, the computer having a control link with the motor.

In accordance with an additional feature of the invention, the rotary encoder is a two-channel tachogenerator.

In accordance with yet another feature of the invention, the control device includes a first measuring device for monitoring the travel speed of the unit, comprising a first monitoring device formed by the rotary encoder, and a first computer linked to the first monitoring device, and a second measuring device for monitoring the travel speed of the unit, comprising a second monitoring device formed by a switch operatable by a cam, and a second computer linked to the second monitoring device.

In accordance with yet a further feature of the invention, the unit is a varnishing device in one of a printing and a varnishing unit, respectively, of a rotary printing machine.

In accordance with yet an added feature of the invention, the unit is a pile-lifting unit in one of a sheet feeder and a delivery, respectively, of a rotary printing machine.

In accordance with a concomitant aspect of the invention, there is provided a machine for processing printing materials, in particular a rotary printing machine, having a device for controlling the travel speed of a unit in the machine, including a motor for driving the unit, the motor being activatable as a function of instantaneous travel positions of the unit, comprising a rotary encoder for registering the instantaneous travel positions, the rotary encoder being constructed as a relative rotary encoder.

Thus, the method according to the invention is distinguished by the fact that the travel speed is additionally monitored by a second monitoring device belonging to the machine.

During fault-free operation of the machine, at least from time to time parallel monitoring of the travel speed is carried out by both measuring devices, so that even in the event of failure of the first measuring device, damage resulting therefrom such as pinching or squeezing or other injuries to the operator of the machine, and the breaking out of teeth of a couplable gear transmission belonging to the machine are reliably avoided.

The control device according to the invention is distinguished by the fact that the rotary encoder is constructed as a relative rotary encoder.

On a region or range of 360° of a rotor of the relative rotary decoder, only a specific portion or length of the entire travel path of the unit, i.e., not the entire length of the travel path, is projected.

Other features which are considered as characteristic for the invention are set forth in the appended claims.

Although the invention is illustrated and described herein as embodied in a method and device for controlling the travel speed of a unit in a machine for processing printing materials, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
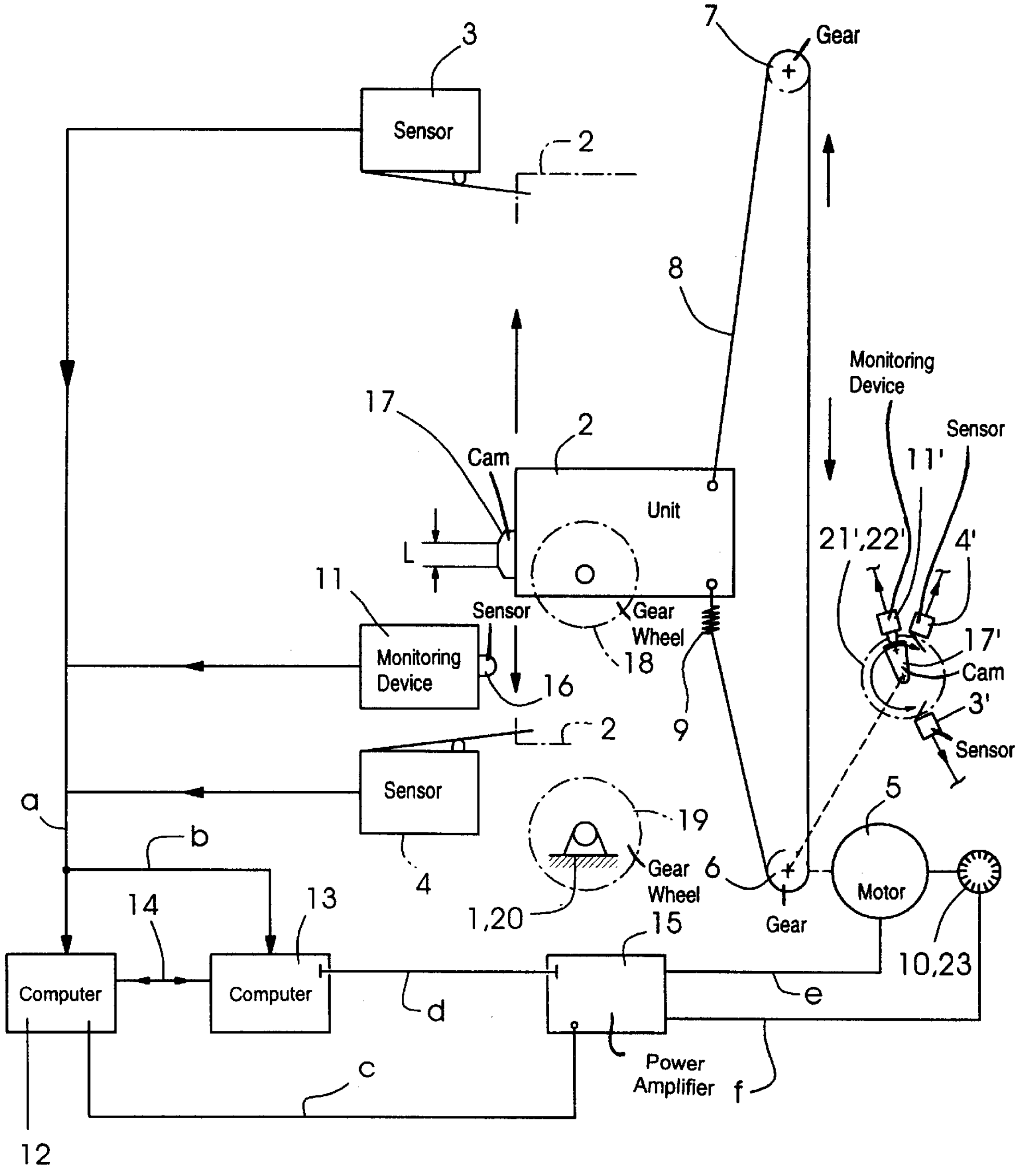
FIG. 1 is a diagrammatic and schematic view of a machine for processing printing materials, having a unit drivable by a motor and movable along a travel path, in accordance with the invention.

Referring now to the drawings and, first, particularly to FIG. 1 thereof, there is shown therein, as a detail, a machine 1 formed as a printing machine for processing printing materials. The detail shows a varnishing unit, which is included in the machine 1 in addition to a number of offset printing units. The varnishing unit includes a unit 2 which is movable vertically but has individual constituent parts which are not otherwise specifically illustrated. The constituent parts include an applicator cylinder for applying the varnish to a sheet of printing material, which in this case rests on an impression cylinder mounted in a frame 20 of the machine 1.

When the unit 2 is moved in the vertical direction into an upper end position which is far removed from the impression cylinder, the upper end position being determined by an upper stop fixed to the frame 20 and detected by a sensor 3, the applicator cylinder is easily accessible for manual cleaning, during which the applicator cylinder is rotated slowly by an auxiliary electric motor via a switchable clutch. The auxiliary motor and the clutch, as well as a feeding device for feeding the varnish during printing and including a dip or an roller disposed in a varnish trough or pan and a metering roller that is in rolling contact with the dip roller and the applicator cylinder, are likewise constituent parts of the unit 2.

When the unit 2 is displaced into a lower end position, which is determined by a lower stop fixed to the frame 20 and detected by a further sensor 4, the applicator cylinder is close to the impression cylinder, and a gear wheel 19 which is connected coaxially with the latter so as to rotate therewith, and a gear wheel 18 which is connected coaxially with the applicator cylinder so as to rotate therewith, are in engagement with one another, in contrast with the upper end position. After the applicator cylinder has been decoupled from the auxiliary motor fixed to the unit 2 by disengaging the clutch, before tooth engagement has been achieved, the applicator cylinder is rotatively drivable during printing, together with the impression cylinder, by a main electric motor of the machine 1, which drives the impression cylinder, via the intermeshing gear wheels 18 and 19.

In order to move the unit 2, the latter is drivable via a gear transmission by an electric motor 5 which has revolving brush current pickups, the gear transmission comprising toothed gears 6 and 7 mounted in the frame 20, and a traction member 8 formed as a chain, which is guided by the gears, has many links and is therefore flexible. The gear 6 driven by the motor 5, in turn, drives the traction member 8 and, via the latter, the gear 7. The ends of the traction member 8 are connected via the unit 2, one end of a section of the traction member 8 led up to the unit 2 from below, as seen in FIG. 1, being fixed to the unit 2 via a helical spring 9 which keeps the traction member 8 under tension and can be loaded in tension, and the other end of a section of the traction member 8 loaded by the weight of the unit 2 and led down to the unit 2 from above, being affixed to the unit 2.

In order to raise and lower the unit 2 in accordance with a multi-phase speed profile (note FIG. 2), the motor 5 is driven by an electronic control device, which comprises two monitoring devices 10 and 11, two computers 12 and 13, a power amplifier 15 and the two sensors 3 and 4. The monitoring unit 10, together with the computer 13, forms a first measuring device for measuring the travel speed of the unit 2, and the second monitoring device 11, together with the computer 12, forms a second measuring device, which measures the travel speed of the unit 2 independently of the first measuring device and, from time to time, in parallel operation with the latter. The two computers 12 and 13, each containing a microprocessor, are linked to one another via a serial bus 14 (a so-called S bus) for interchanging commands and status messages. The power amplifier 15 (a so-called power output stage) which applies currents to the motor 5 and is linked to the latter for this purpose via an electric line e, is linked via further electric lines c, d and f to the monitoring device 10 and the computers 12 and 13. The sensors 3 and 4, and also the monitoring device 11, are linked to the computers 12 and 13 via the lines a and b.

In FIG. 1, for improved clarity, the electric lines of the control device are illustrated by combined line runs. The lines a and b, respectively, are triple-pole or tripolar, the line c is single-pole or unipolar, the line d has 34 poles, the line e is double-pole or bipolar, and the line f is four-pole or quadripolar.

The sensors 3 and 4, as well as the monitoring device 11 arranged therebetween in the lower quarter of the travel path, are each formed as a mechanically operated switch which is affixed to the frame 20, the electrical current flow thereof, in the state of the switch wherein it is pressed from time to time by the unit 2, being different from that in the nonpressed state of the switch, for example, being interrupted. In order to operate a sensor 16 similar to a push-button and belonging to the monitoring device 11, the unit 2 is provided with a chamfered cam 17 having a given switching length L of, for example, 20.2 mm which, when the unit 2 passes by the monitoring device 11, presses the sensor 16 back over the switching length L and, as a result, keeps the monitoring device 11 in a specific switching state until the sensor 16 is no longer within the switching length L which has passed it by, and automatically springs forward again, as a result of which the monitoring device 11 is switched back. The monitoring device 10 is formed as an incremental encoder and, more precisely, a rotary encoder in the form of a two-channel tachogenerator, the construction of which will be explained briefly hereinbelow in the interest of providing a better understanding thereof. The tachogenerator is an optical pulse generator having a rotor 23 which is rotatable by the motor 5, is connected coaxially to the shaft of the motor so as to rotate therewith and is encoded with markings. The rotor is formed as a disk, which is provided with slits as the markings. The slits are formed in the disk at a constant distance from one another running in a row coaxially about the axis of rotation of the disk and, as the disk rotates, are scanned by two optical sensors in the form of light barriers which are arranged so as to be stationary and offset by an angle from one another in the circumferential direction of the disk, and each of the sensors generates a signal for each slit during each revolution of the disk. The successively triggered signals are converted by an amplifier circuit integrated into the tachogenerator into two square-wave signals with a 90° phase shift relative to one another. In this way, all the slits in the disk are scanned in succession by the optical sensors during each revolution of the disk. The electronic control device detects the respective then-existing direction of rotation of the motor as to whichever one of the two square-wave signals leads the other and which is the trailing one. In other words, during each revolution of the rotor 23 (disk) thereof, the tachogenerator generates two signals for each marking (slit), the respective phase-shift direction of which corresponds to the respective direction of rotation of the motor 5 and the respective direction of travel of the unit 2. The electronic control device calculates the speed of rotation of the motor 5 from the frequency of at least one of the two periodic square-wave signals. At the same time, the control device counts the number of revolutions executed by the disk as the unit 2 travels over the travel path thereof from one end position into the respective other end position, the number far exceeding the value "one".

In a modification differing only slightly with regard to the construction and virtually not at all with regard to the functional principle of the machine 1 described hereinbefore, the parts 3, 4, 11 and 17 are arranged in alternative installation positions. The alternative installation positions are identified by an apostrophe on the otherwise identical numbers of the parts, which are arranged offset. The modified embodiment also includes the parts 21' and 22'. The reference character 21' to which a gear wheel 22' belongs, identifies a gear transmission that has a drive connection to the gear 6 and therefore to the traction member 8, the gear wheel 22' being connected so as to rotate with the cam 17', so that the latter corotates or rotates together with the gear wheel 22', which does not execute any full revolution because of the reduction ratio. The gear wheel 22', which is mounted in the frame 20, rotates in the clockwise direction or the counterclockwise direction, depending upon the travel direction of the unit 2. The given or previously known switching length of the cam 17' is a sheet length in the modified arrangement, whereover the cam 17' operates the monitoring device 11' arranged in the pivoting path thereof. When the unit 2 is located in the lower end position thereof, the cam 17' is pivoted into a reversal point, wherein it operates the sensor 4'. When the unit 2 is located in the upper end position thereof, the cam 17' holds the sensor 3' in pressed condition.

Figure 2:
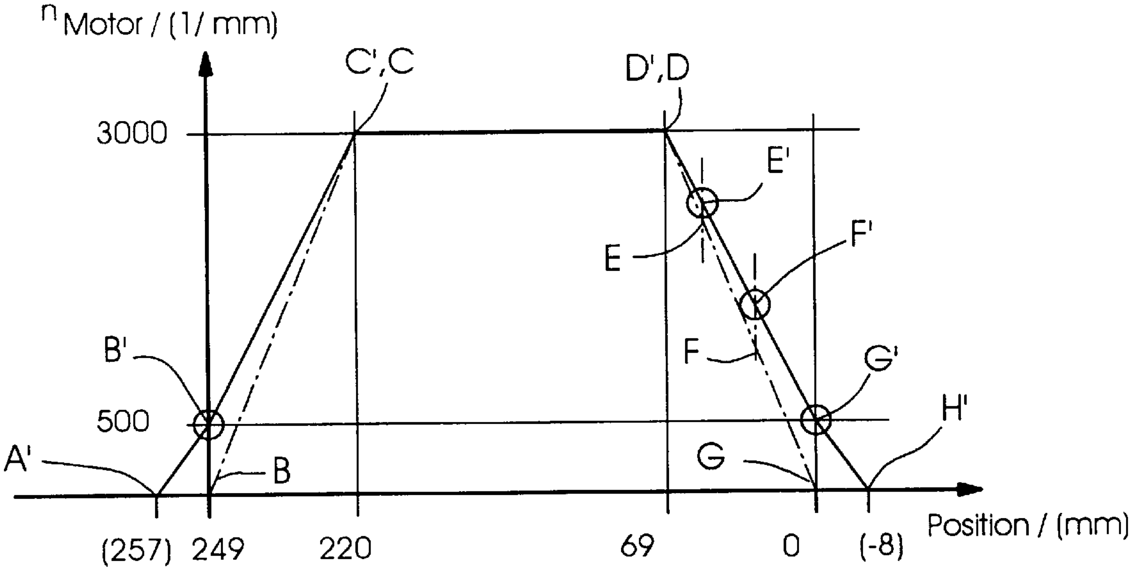
FIG. 2 is a plot diagram showing the speed of rotation of the motor as a function of various positions of the unit within the travel path.

Hereinafter, the implementation of the method according to the invention with the device illustrated herein is explained:

Illustrated in FIG. 2 is a rotational-speed curve of the motor 5, having curve points A' to H', which are stored in the computer 13 as software in the form of a characteristic or performance map. Those curve points located between the curve points A' to H' are calculated by the computer 13 by interpolation. The curve sections A'–B' and G'–H' apply only in the modified embodiment (arrangement 3', 4', 11' and 17'). As the motor starts up, within the curve section from H' to G', the traction member 8 is tautened, without the unit 2 initially being moved out of the lower end position thereof, which it has at the curve point G. Within the curve region G' to H', as the motor 5 runs down, the load run of the traction member 8, which bears the weight of the unit 2 as it is raised, is loosened, and that section of the traction member 8 that functions as an empty run when the unit 2 is being raised begins to be tensioned via the spring 9, although the unit 2 has already reached the lower end position thereof at the curve point G', and does not continue to move farther beyond this. The pre-travel and post-travel of the traction member 8 resulting with respect to the unit 2 is taken into account as apparent travel of the unit 2 of 8 mm, respectively, with the cam 17' coupled to the traction member 8 via the gear transmission 21, the cam 17' continuing to run somewhat after the unit 2 has reached the respective end position thereof, before the cam 17' operates the respective sensor 3' or 4'. The curve point A' represents the upper end position of the unit 2, wherein the latter is suspended on the tautly tensioned traction member 8. A curve which relates to the unmodified machine 1 (arrangement 3, 4 and 17) is shown in phantom, i.e., with a dot-dash line in the plot diagram or graph presented in FIG. 2, and includes the curve points B to G which correspond in terms of their significance to the curve points B' to G'.

When the unit 2 is moved down from the upper end position B' thereof, the desired rotational speed is increased as a linear function of the position of the unit 2, linearly above this position, until, at the position 220.16 mm at the curve point C', the maximum rotational speed of 3000 revolutions per minute, i.e., 50 revolutions per second, is reached. At this rotational speed, the unit 2 travels downwardly to the position 69.8 mm, which is reached at the curve point D'. Beginning at the latter curve point, the rotational speed is reduced so that, at the curve point G' at the position 0 mm, when the unit 2 reaches the lower stop thereof, the rotational speed of 500 revolutions per minute, i.e., 8.3 revolutions per second, is reached by the motor 5. During the travel of the unit 2, the computer 13 registers the position and speed of the unit 2 with the aid of the monitoring device 10 and the sensors 3 and 4, and controls the rotational speed and position thereof in accordance with the principle of a cascade control system. The computer 12 gives the computer 13 the commands to raise and lower the unit 2 and monitors the speed of travel of the unit 2 with the aid of the monitoring device 11 as the unit 2 is lowered in the critical range E–F or E'–F', shortly before the gear wheel 18 thereof comes into engagement with the gear wheel 19, i.e., shortly before the unit 2 reaches the position 0 mm thereof, referred to the lower stop. The speed in the curve range E–F or E'–F' is calculated by the computer 12, in that it divides the switching travel L by the switching time during which the monitoring device 11 or 11' is kept switched over from time to time by the sensor 16 thereof being pressed by the cam 17 and 17', respectively, sliding along on the latter.

The switching travel L begins at the position 52.4 mm and extends as far as the position 32.6 mm. The computer 12 measures the time between the rising and the falling edge of a switching signal routed from the monitoring device 11 to the computer 12, and can therefore infer the speed of the unit 12.

If the quotient, and therefore the actual speed of travel exceeds a specific value corresponding to the desired or nominal speed of travel, and if the speed of the unit 2 in this case is so high that there would be a risk of the unit 2 striking the lower stop thereof excessively hard, and destroying the gear wheels 18 and 19, the computer 12 then advantageously intervenes and stops the motor 5 via the line c, independently of the computer 13, generally by the computer 12 blocking the enabling of the power amplifier 15 and, as a result, bringing the unit 2 to a standstill before it is put in place. Because the computer 13 every few milliseconds compares the actual rotational speed of the motor 5, which is registered or determined by the monitoring device 10, with the desired or nominal rotational speed thereof, which is stored in accordance with the speed profile (note FIG. 2) in the computer 13, the intervention of the computer 12 which reduces the speed of downward travel of the unit 2 is needed only in the event of a defect in the computer 13. If, in such a case, the motor 5 is switched off by the computer 12, then after the cams 17 and 17', respectively, have been switched off, both out of contact with the sensors 3 and 3', respectively, and also out of contact with the sensors 4 and 4', respectively, then after the motor 5 has been switched on again, the unit 2 is moved upwardly at a limited speed until the sensors 3 and 3', respectively, are operated. The sensors 3 and 3', respectively, are therefore advantageously used for the self-calibration of the control device, in that they signal a reference position for the monitoring device 10, which therefore does not have to be constructed as an absolute rotary encoder but can be a relative rotary encoder.

When the unit 2 moves downwardly without any fault or failure, the sensor 4 is used to switch off the motor 5 and is used by the computer 13 for determining the absolute position of the unit 2. As it travels upwardly, the unit 2 passes through the speed profile shown in FIG. 2 in the opposite direction, from the position 0 mm as far as the position 249 mm.

The time for moving the unit 2 in both directions of movement can advantageously be kept as small as possible by determining the speed of the unit 2 as a function of the positions thereof stored in the computer 13 and the calculated intermediate positions thereof.

We claim:

1. A method of controlling the travel speed of a unit in a machine for processing printing materials, which comprises:

monitoring the travel speed by a first measuring device; and additionally monitoring the travel speed by a second measuring device belonging to the machine.

2. The method according to claim 1, wherein, during fault-free operation of the machine, simultaneously monitoring the travel speed of the unit by the first measuring device and by the second measuring device, which acts independently of the first measuring device.

3. The method according to claim 1, which includes monitoring the travel speed by the first measuring device over the entire travel of the unit, lying between two opposite end positions, and monitoring the travel speed by the second measuring device only in a critical section of the travel.

4. The method according to claim 3, which includes having the unit move through the critical travel section shortly before moving a gear wheel fixed to the unit into engagement with a further gear wheel.

5. A device for controlling the travel speed of a unit in a machine for processing printing materials, the unit having end positions, the device comprising:

a travel path having a length limited by the end positions of the unit;

a motor for driving the unit along said travel path, said motor being activatable as a function of instantaneous travel positions of the unit; and a relative rotary encoder for registering the instantaneous travel positions, said relative rotary encoder having a rotor with a circumferential range of 360°, said circumferential range being a measuring representation of only a portion of said length.

6. The control device according to claim 5, wherein said relative rotary encoder has a sensor assigned thereto for detecting one of the end positions of the unit, the one end position serving as a reference value for automatically calculating the instantaneous travel positions.

7. The control device according to claim 5, wherein said rotary encoder has a rotor connected to the unit so that, while the unit moves from the one end position to another one of the end positions of the unit, said rotor executes a plurality of complete revolutions.

8. The control device according to claim 7, wherein said relative rotary encoder has a control link with a computer for adding up the revolutions, said computer having a control link with the motor.

9. The control device according to claim 5, wherein said relative rotary encoder is a two-channel tachogenerator.

10. The control device according to claim 5, further comprising:

a first measuring device for monitoring the travel speed of the unit having a first monitoring device, said first monitoring device being formed by said rotary encoder and a first computer linked to said first monitoring device; and a second measuring device for monitoring the travel speed of the unit having a second monitoring device, said second monitoring device being formed by a switch operatable by a cam and a second computer linked to said second monitoring device.

11. The control device according to claim 5, wherein the unit is a varnishing device in one of a printing and a varnishing unit, respectively, of a rotary printing machine.

12. The control device according to claim 5, wherein the unit is a pile-lifting unit in one of a sheet feeder and a delivery, respectively, of a rotary printing machine.

13. A machine for processing printing materials, comprising:

a unit having end positions;

a device for controlling a travel speed of said unit, said device defining a travel path having a length limited by the end positions, said device having a motor for driving said unit along said travel path, said motor being activatable as a function of instantaneous travel positions of said unit; and a rotary encoder for registering said instantaneous travel positions, said rotary encoder being constructed as a relative rotary encoder, said relative rotary encoder having a rotor with a circumferential range of 360°, said circumferential range being a measuring representation of only a portion of said length.

14. A device for controlling the travel speed of a unit in a machine for processing printing materials, the device comprising:

a motor for driving the unit, the motor being activatable as a function of instantaneous travel positions of the unit; and a relative rotary encoder for registering the instantaneous travel positions, said relative rotary encoder having a rotor to be connected to the unit so that, while the unit moves from one end position to an opposite end position of the unit, said rotor executes a plurality of complete revolutions.

* * * * *